United States Patent
Funk et al.

(10) Patent No.: US 10,759,418 B2
(45) Date of Patent: Sep. 1, 2020

(54) SYSTEM AND METHOD FOR PROXIMITY-BASED CONTROL OF OUTDOOR POWER MACHINES

(71) Applicant: Husqvarna AB, Huskvarna (SE)

(72) Inventors: Jonathan Funk, Concord, NC (US); Mattias Karlsson, Jr., Huskvarna (SE)

(73) Assignee: Husqvarna AB, Huskvarna (SE)

( * ) Notice: Subject to any disclaimer, the term of this patent is extended or adjusted under 35 U.S.C. 154(b) by 352 days.

(21) Appl. No.: 15/540,383

(22) PCT Filed: Dec. 2, 2015

(86) PCT No.: PCT/IB2015/059304
§ 371 (c)(1),
(2) Date: Jun. 28, 2017

(87) PCT Pub. No.: WO2016/108103
PCT Pub. Date: Jul. 7, 2016

(65) Prior Publication Data
US 2018/0265080 A1    Sep. 20, 2018

Related U.S. Application Data

(60) Provisional application No. 62/097,380, filed on Dec. 29, 2014.

(51) Int. Cl.
*B60W 30/08*    (2012.01)
*B60T 7/22*    (2006.01)
(Continued)

(52) U.S. Cl.
CPC ............ *B60W 30/08* (2013.01); *B60T 7/22* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS 4,672,941 A * 6/1987 Yamagata ............. F02P 5/1558
123/179.5
5,314,037 A    5/1994 Shaw et al.
(Continued)

FOREIGN PATENT DOCUMENTS

JP    2013231712 A    11/2013
WO    2007/000686 A2    1/2007

OTHER PUBLICATIONS

Periu, C.F. et al., "Isolating Vibrations on Laser Range Scanners Mounted on Agricultural Vehicles to Improve the Detection of Foreign Objects," uO Research, © Carlos Fresquet Periu, Ottawa, Canada, 2012, pp. 1-292 (relevant pp. 2-3).
(Continued)

*Primary Examiner* — Justin Holmes
(74) *Attorney, Agent, or Firm* — Trego, Hines & Ladenheim, PLLC; Brandon Trego; Jonathan Hines

(57) ABSTRACT

An outdoor power machine proximity-based control system includes: a controller operably connected to an outdoor power machine, the controller being configured to control a pre-determined function of the outdoor power machine in response to a triggering event, the controller including a communications device configured to receive a signal indicative of a location of an object relative to the outdoor power machine, wherein in response to the received signal, the controller compares the location of the object to a pre-determined threshold and in response to the comparison causes an action to prevent interaction between the outdoor power machine and the object.

19 Claims, 7 Drawing Sheets

(51) Int. Cl.
  *B60W 10/06* (2006.01)
  *B60W 10/10* (2012.01)
  *B60W 50/14* (2020.01)
  *F02P 9/00* (2006.01)

(52) U.S. Cl.
  CPC ............. *B60W 50/14* (2013.01); *F02P 9/002* (2013.01); *B60T 2201/022* (2013.01); *B60W 2300/156* (2013.01); *B60W 2554/00* (2020.02); *B60W 2710/06* (2013.01); *B60W 2710/10* (2013.01)

(56) References Cited

U.S. PATENT DOCUMENTS

| | | | |
|---|---|---|---|
| 5,974,347 A | 10/1999 | Nelson | |
| 6,026,921 A * | 2/2000 | Aoyama | B60K 6/48 180/65.25 |
| 6,212,448 B1 | 4/2001 | Xydis | |
| 6,255,793 B1 | 7/2001 | Peless et al. | |
| 7,499,155 B2 | 3/2009 | Cappelletti | |
| 8,248,263 B2 * | 8/2012 | Shervey | F16P 3/147 340/539.1 |
| 2002/0082803 A1 * | 6/2002 | Schiffbauer | G08B 21/0213 702/159 |
| 2005/0197235 A1 * | 9/2005 | Boe | B60W 10/06 477/107 |
| 2006/0042212 A1 | 3/2006 | Shoemaker et al. | |
| 2006/0271263 A1 | 11/2006 | Self et al. | |
| 2007/0240693 A1 * | 10/2007 | Lykowski | F02P 3/04 123/620 |
| 2010/0194209 A1 | 8/2010 | Richter | |
| 2011/0108002 A1 * | 5/2011 | Leufen | F02P 9/002 123/406.58 |
| 2014/0063232 A1 | 3/2014 | Fairfield et al. | |
| 2015/0084768 A1 * | 3/2015 | Brooks | G08B 21/02 340/539.11 |

OTHER PUBLICATIONS

International Search Report and Written Opinion in the International Application No. PCT/IB2015/059304 dated Mar. 17, 2016.
International Preliminary Report on Patentability in the International Application No. PCT/IB2015/059304 dated Jul. 4, 2017.

* cited by examiner

SYSTEM AND METHOD FOR PROXIMITY-BASED CONTROL OF OUTDOOR POWER MACHINES

BACKGROUND OF THE INVENTION

This invention relates generally to outdoor power machines and more particularly to a system and method for proximity-based control of outdoor power machines.

Outdoor tasks, such as grooming and maintaining property, are commonly performed using various outdoor power machines that are configured for the performance of corresponding specific tasks. As used herein an "outdoor power machine" is defined generally as any machine having a prime mover driving a component, implement, or attachment which is operable for material removal and/or material handling. Non-limiting examples of outdoor power machines include lawn mowers, snow blowers, chain saws, blowers, and hand-held trimmers. Outdoor power machines, such as riding lawn mowers, walk behind lawn mowers, string trimmers, hedge trimmers, and the like are used to maintain a yard while outdoor power machines such as snow blowers are used to maintain driveways, sidewalks, and the like during the winter months when snow accumulates thereon.

The convenience and versatility of outdoor power machines makes them very popular among consumers; however, the use of outdoor power machines can come with dangers due to user neglect or improper use. Outdoor power machines come in many varieties and therefore can employ different operational parameters which can cause inexperienced users to use the outdoor power machine improperly. Even outdoor power machines of the same type, i.e., riding lawn mowers, can operate differently from one to the next.

Additionally, users of outdoor power machines, especially those who have performed the same task with the outdoor power machine repeatedly, can often become unaware of their surroundings. For example, a user using a riding lawn mower to mow his/her lawn may not realize that a dog is chasing the lawn mower around the yard or that a child has come into the yard to play. The user may be focused on mowing around a landscape bed and forget about the play set in the middle of the yard or a corner of a building that is sticking out awkwardly into a confined area of the yard. A user listening to music may not hear an individual walking into the yard trying to get the user's attention, and a first time operator may lose control and run into a tree.

Accordingly, there remains a need for a system and method to provide proximity-based control for outdoor power machines that is capable of monitoring objects in the yard and shutting down the outdoor power machine prior to coming in contact with the object.

BRIEF SUMMARY OF THE INVENTION

This need is addressed by the present invention, which provides a system and method for controlling an outdoor power machine in response to an object present in a work area.

According to an aspect of the invention, an outdoor power machine proximity-based control system includes a controller operably connected to an outdoor power machine and configured to control a pre-determined function of the outdoor power machine in response to a triggering event. The controller includes a communications device configured to receive a signal indicative of a location of an object relative to the outdoor power machine, wherein in response to the received signal, the controller causes an action to prevent interaction between the outdoor power machine and the object.

According to another aspect of the invention, an outdoor power machine proximity-based control system includes a controller operably connected to an outdoor power machine. The controller is configured to control pre-determined functions of the outdoor power machine and includes a housing and electronics. The housing having a receptacle at a first end of the housing for receiving a spark plug of the outdoor power machine therein and a spark plug terminal at a second end of the housing for being received by a spark plug terminal of an electrical system of the outdoor power machine. The electronics include a switching circuit operably connected to a communications device. The switching circuit is configured to interrupt an electrical path between the electrical system of the outdoor power machine and the spark plug. The system further includes at least one transmitter operably connected to an object in a work area of the outdoor power machine. The transmitter is configured to transmit a signal that is received by the communications device and the communications device is configured to receive the signal and determine a strength thereof. When a strength of the signal meets a pre-determined threshold, the communications device causes the switching circuit to interrupt the electrical path, thereby shutting down a prime mover of the outdoor power machine.

According to another aspect of the invention, an outdoor power machine proximity-based control system includes a controller operably connected to an outdoor power machine and a transmitter configured to transmit a signal. The controller is configured to control pre-determined functions of the outdoor power machine and includes electronics operably connected to controls of the outdoor power machine. The electronics include a communications device configured to receive data and a processor to process data received by the communications device. The transmitter is configured to transmit a signal and provide data indicative of a location of an object present in a work area of the outdoor machine to the communications device. The data is processed by the processor, and wherein after processing the data, the processor instructs a control of the outdoor power machine to perform an action.

According to another aspect of the invention, an outdoor power machine obstacle avoidance method includes the steps of detecting an object located in a work area of an outdoor power machine, in response to detection of an object, determining a location of the object relative to the outdoor power machine, comparing a distance from the location of the object to a location of the outdoor power machine to a pre-determined threshold, and in response to the comparison, causing an action to prevent interaction between the outdoor power machine and the object.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
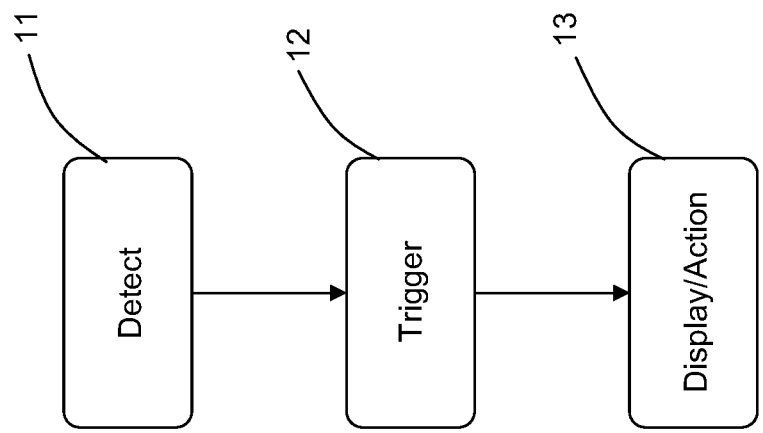
FIG. 1 is a flow diagram of a method according to an embodiment of the invention.
Figure 2:
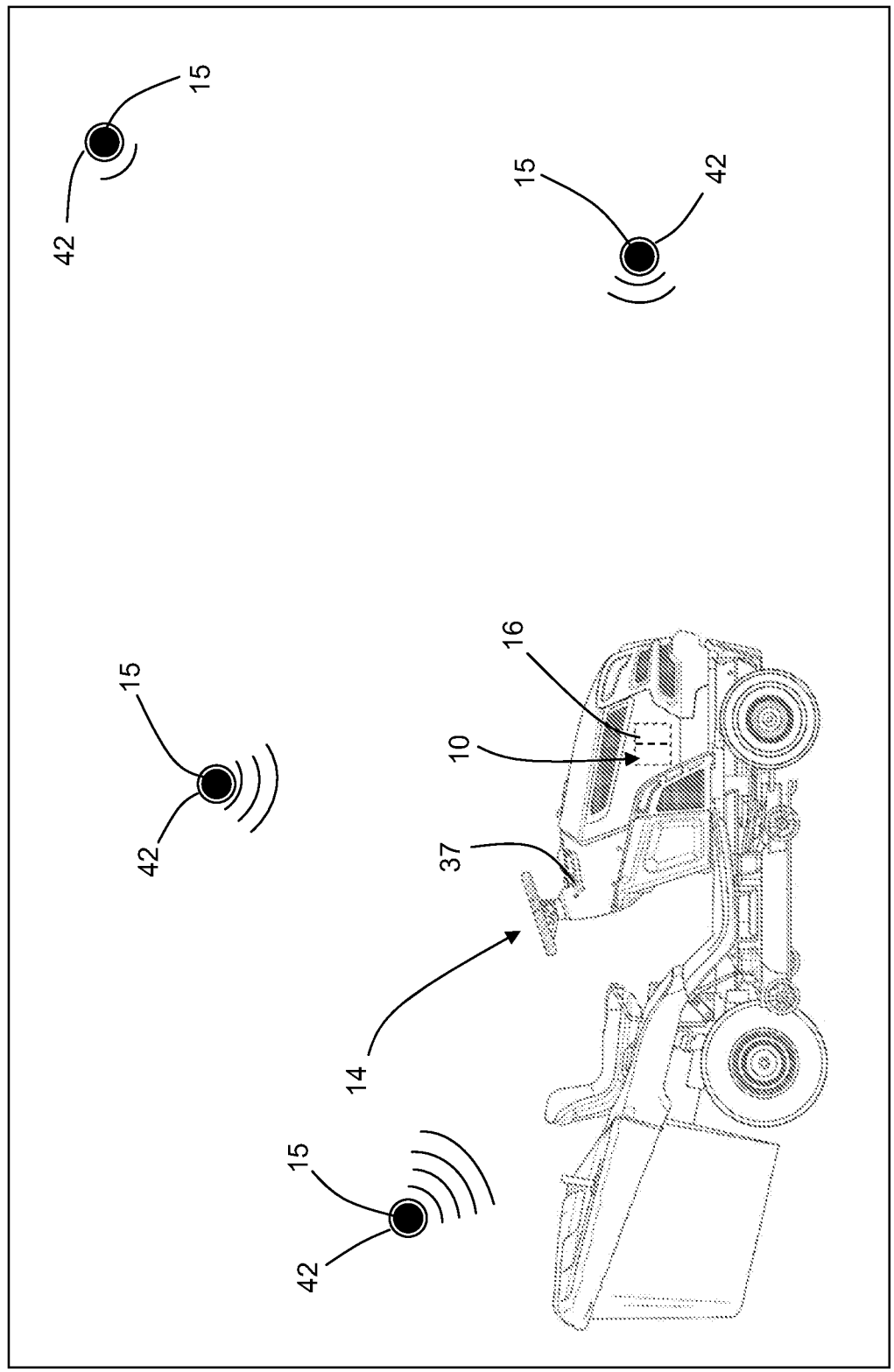
FIG. 2 is a schematic of a system according to an embodiment of the invention.

Referring to the drawings wherein identical reference numerals denote the same elements throughout the various views, FIGS. 1 and 2 illustrate a system and method according to an embodiment of the invention and is shown generally at reference numeral 10. In general, the system 10 is operably connected to an outdoor power machine 14 which is located within a work area that may also contain one or more objects 15. As used herein, the term "object" refers to any obstacle that may be in close-proximity to the outdoor power machine, i.e., an inanimate object such as a tree or toy, an individual such as a child, and/or a pet. Additionally, the term "work area" refers to a geographical area defined by a pre-determined boundary. For example, the work area for a user mowing his/her lawn may be the surveyed property lines for that particular residence. Likewise, the work area for a user cutting down a tree may be the area around the tree where the tree could safely fall, i.e., a safety zone.

The system 10 is operable to detect the objects 15 (see block 11 in FIG. 1). Presence of the object 15 creates a triggering event, block 12, causing the system 10 to determine the distance between the object 15 and the outdoor power machine 14 and compare it to a pre-determined safety threshold selected to prevent interaction between the outdoor power machine 14 and the object 15. As will be explained in more detail below, the process of determining the distance and comparing it to a threshold may be as simple as determining that the object 15 is anywhere within a detectable range.

Once the system 10 compares the distance to the pre-determined safety threshold, block 12, the system 10 performs an appropriate action, block 13. An appropriate action may take on several forms. For example, the system 10 may provide a user with an audible alert to inform the user that an object is present. The system 10 may also provide a visual representation of the geographical location of the object 15. Additionally, the system 10 may change the operation of the outdoor power machine 14. For example, the system 10 may shut down the outdoor power machine 14 and make it inoperable, disengage the transmission of the outdoor power machine 14 to prevent the outdoor power machine 14 from moving or disengage only a portion of the transmission so that a user cannot activate "reverse", disengage a cutting apparatus of the outdoor power machine 14 such as a lawn mower deck or chain of a chain saw, and/or any other suitable action that enhances safety and prevents a dangerous interaction between the outdoor power machine 14 and the object 15.

More particularly, the system 10 may operate as a kill switch to quickly shut down a prime mover 16, thereby shutting down the outdoor power machine 14 or operate as a controller to provide alerts to a user and/or to control specific functions of the outdoor power machine 14. As used herein, a prime mover is any device used to drive a component, implement, or attachment and includes, but is not limited to, internal combustion engines and/or electric motors. The prime mover 16 may be provided with a self-starter (not shown), or in the case of an electric motor, appropriate switching equipment (not shown). Generally, a kill switch is any device that interrupts an electrical signal used to operate the prime mover 16, for example, a device that interrupts an electrical path to a spark plug in an internal combustion engine.

Figure 3:
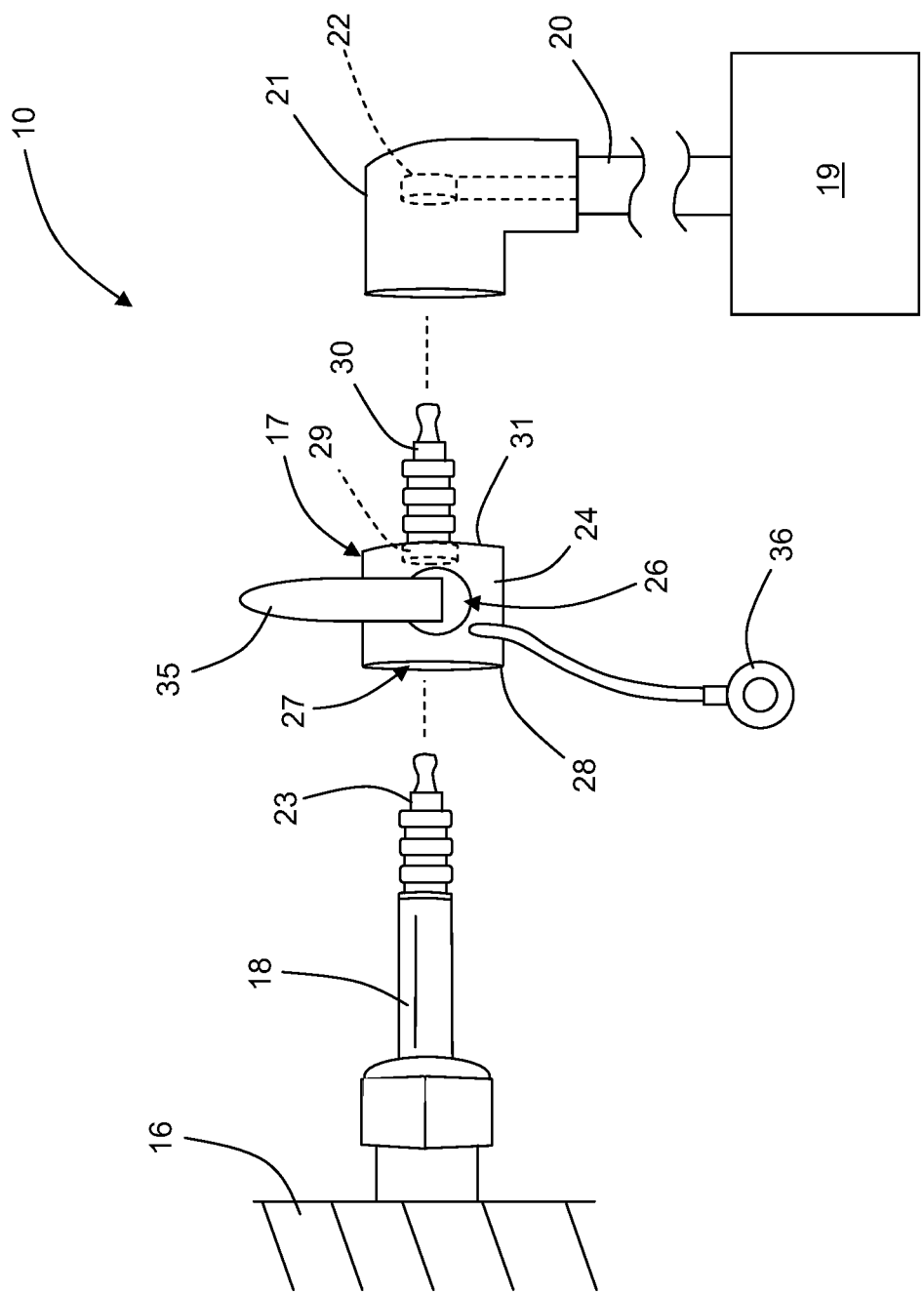
FIG. 3 illustrates a controller.

In one embodiment, FIG. 3, the system 10 includes a controller, such as circuit interrupter 17 configured to provide an intermediate circuit between a spark plug 18 and the prime mover's electrical system 19. The electrical system 19 provides electrical energy to the spark plug 18 via a spark plug wire 20 connected to the system 19 and grommet 21 having a female spark plug terminal 22 configured to electrically connect the wire 20 to the spark plug's terminal 23. One of the benefits of an intermediate circuit interrupter like circuit interrupter 17 is that the circuit interrupter 17 may be installed on existing outdoor power machines without any major modifications.

The circuit interrupter 17 includes a housing 24 having electronics 26 contained therein. The housing 24 includes a female receptacle 27 for receiving the spark plug 18 therein at a first end 28 of the housing 24. A female spark plug terminal 29 configured for mating engagement with the terminal 23 is contained in the female receptacle 27 to provide an electrical connection between the electronics 26 and the spark plug 18. A male spark plug terminal 30 is positioned at a second end 31 of the housing 24 and is configured for mating engagement with female spark plug terminal 22 to provide an electrical connection between the electrical system 19 and the electronics 26.

Figure 4:
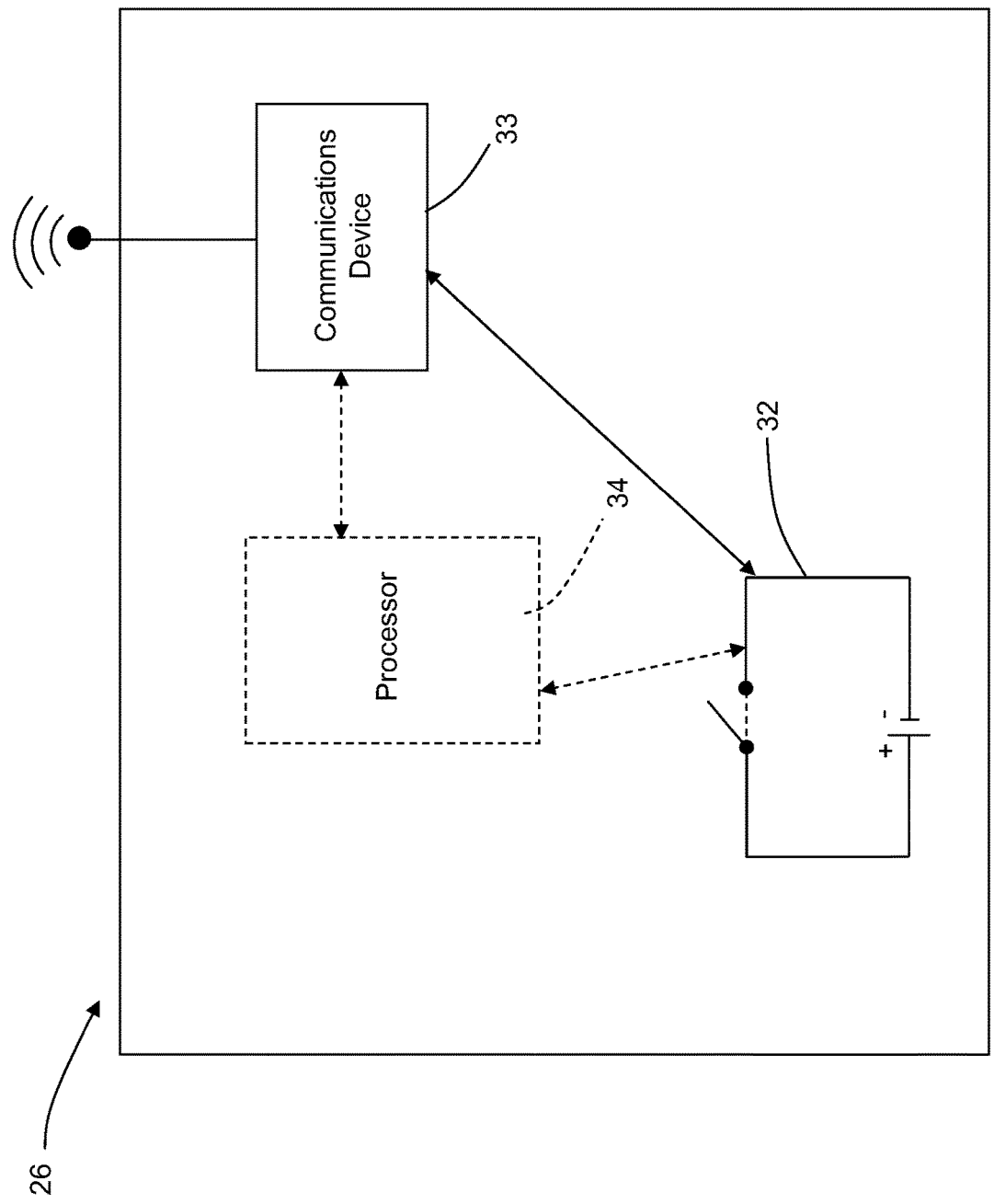
FIG. 4 is a schematic of the controller of FIG. 3.

The electronics 26, FIG. 4, include a switching circuit 32 operably connected to a communications device 33. The switching circuit 32 is configured to interrupt an electrical path between the electrical system 19 and the spark plug 18 when shut down of the prime mover 16 is desired and to provide an electrical path between the electrical system 19 and the spark plug 18 when it is desired to operate the prime mover 16. In operation, the switching circuit 32 interrupts the electrical path in response to a signal provided by the communications device 33 indicating that an object is too close to the outdoor power machine 14. In its simplest form, the switching circuit 32 may interrupt the electrical path in response to any indication of a signal being received by the communications device 33. The switching circuit 32 maintains the electrical path when no signal is present.

Optionally, the electronics 26 may include microprocessor or simply a "processor" 34 operably connected to the switching circuit 32 and communications device 33. In this arrangement, the processor 34 receives the signal from the communications device 33, processes the signal, and then provides a control signal to the switching circuit 32 instructing the switching circuit to either open or close.

The communications device 33 includes one or more interface mechanisms for enabling communication with external devices. For example, a network interface chip or card including a wireless transceiver may use known wireless protocols to receive and/or transmit data. The communications device 33 is configured to transmit and receive data and is connected to an antenna/receiver 35 to transmit and receive the data. The communications device 33 and the antenna/receiver 35 may be configured to communicate with active and/or passive transmitters, such as active or passive radio frequency identification ("RFID") tags. A ground strap 36 is connected to the switching circuit 32. The ground strap 36 is connected to a ground such as the prime mover 16, outdoor power machine chassis, and/or any other suitable ground. The ground strap 36 allows the switching circuit 32 to ground itself, thereby interrupting the electrical path between the electrical system 19 and the spark plug 18.

While the circuit interrupter 17 is being described as an intermediate circuit installed between the spark plug 18 and the grommet 21 and for mating engagement with the spark plug 18 and grommet 21, it should be appreciated that the circuit interrupter 17 may take different physical forms and may be installed at any juncture so long as it is capable of interrupting the electrical path between the electrical system 19 and the spark plug 18.

Figure 5:
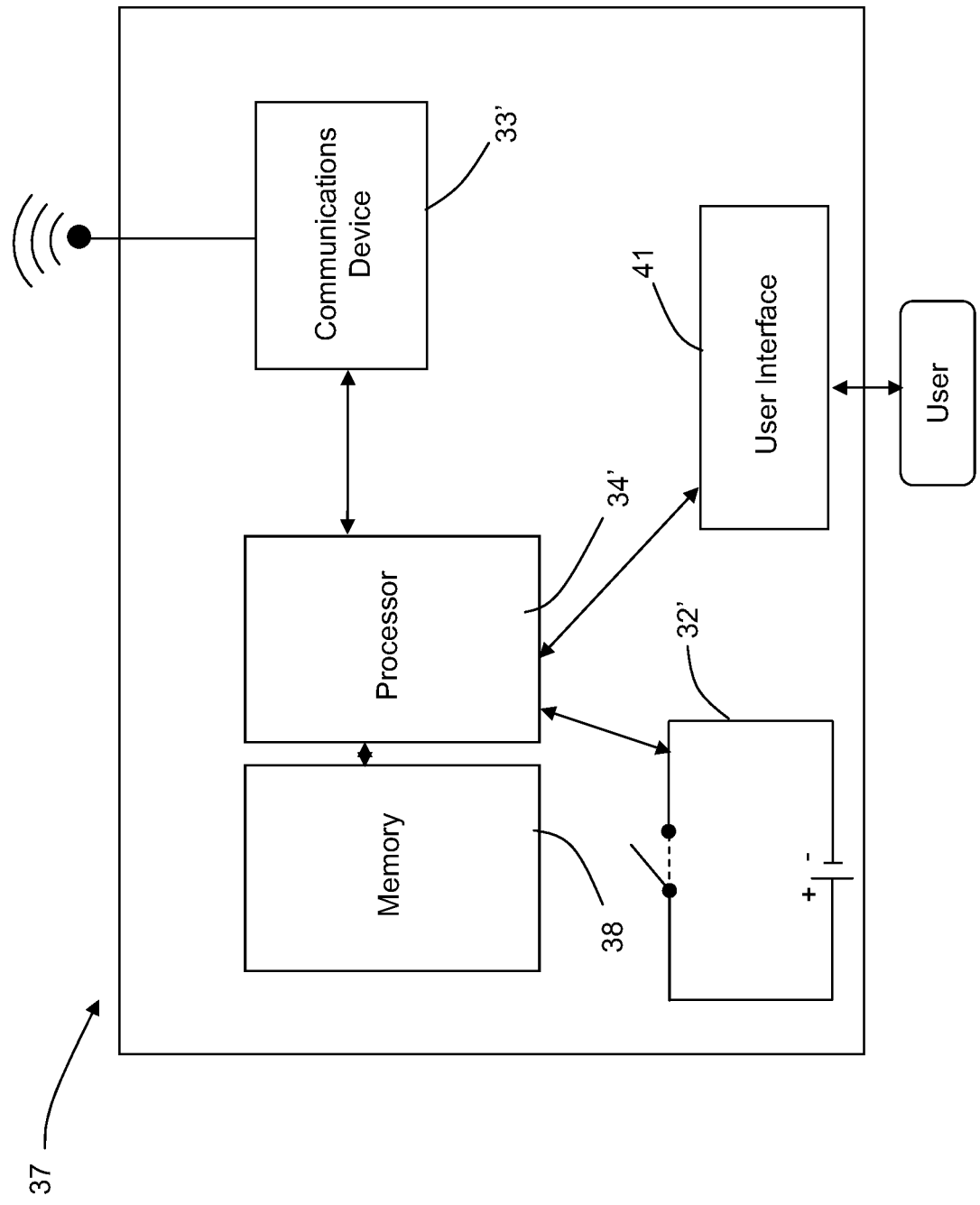
FIG. 5 is a schematic of an alternative controller.

In situations where the outdoor power machine 14 has an integrated controller 37, FIG. 5, the controller 37 may be used to shut down or control the outdoor power machine 14 in response to a signal indicating an object is too close. As illustrated, the controller 37 may include microprocessor or simply a "processor" 34' operably connected to memory 38, a communications device 33', and a user interface 41.

The system 10 further includes transmitters 42 configured to communicate with the communications device 33. As shown, the transmitters 42 are wearable transmitters, i.e., a watch, wrist band, key chain, dog collar to name just a few. The transmitters 42 may be worn by pets and/or people and may also be attached to inanimate objects such as a tree, fence post, or other objects positioned throughout a designated area that a user may want to protect. A nonlimiting example of a transmitter 42 is an active or passive RFID tag.

The transmitters 42 transmit a wireless signal to the communications device 33 indicating to the communications device 33 that an object is present in the area that the outdoor power machine 14 is operating. The strength of the signal that the communications device 33 receives from the transmitter 42 is dependent on distance between the communications device 33 and the transmitter 42. Thus, the strength of the signal is indicative of a distance between the outdoor power machine 14 and the object.

Figure 6:
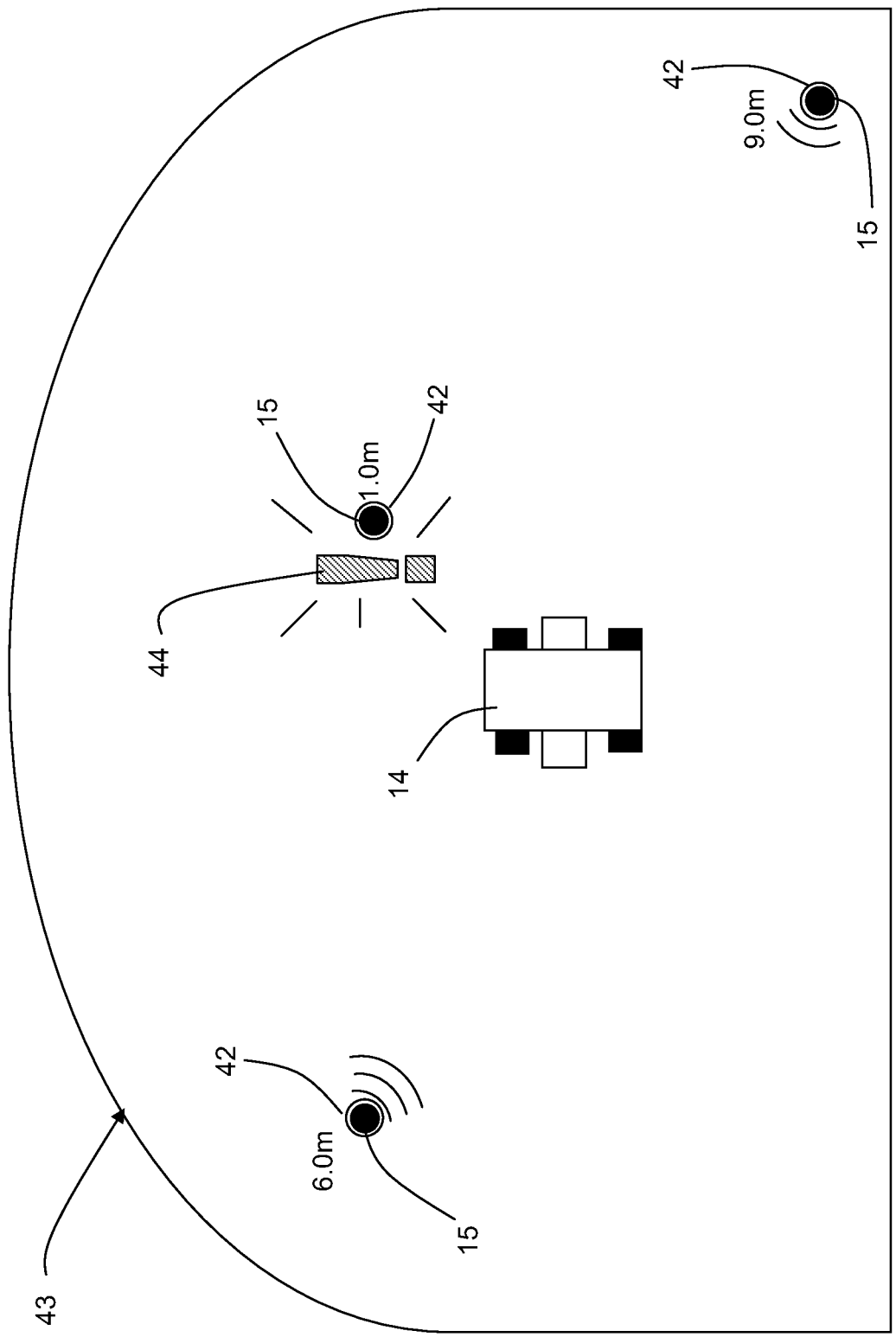
FIG. 6 is a schematic of a visual display.

The system 10 may also incorporate a visual display 43, FIG. 6, such as a liquid crystal display (LCD) or light emitting diode (LED) display. The visual display 43 provides a user with a visual indication of the location of each object that the user wants to avoid while operating the outdoor power machine 14. Audible alerts may also be incorporated in combination with the visual display 43. As shown, the display 43 provides a user with the location (i.e., geographical location as well as distance between the outdoor power machine 14 and the transmitters 42) for each transmitter 42. The display 43 also provides visual warnings to the user when the outdoor power machine 14 encroaches upon a transmitters 42 location. The visual warnings may be of various forms, for example, the transmitter locations may be shown as green when a safe distance is achieved, yellow when the distance is in a caution range, and red when the distance between the transmitter 42 and outdoor power machine 14 is too short. Symbols such as an exclamation point 44 may also be used to provide a user with a visual cue.

The visual display 43 would allow a user to view the geographical location and distance of an object and take corrective action prior to the system 10 taking an action such as shutting down the outdoor power machine 14. Thus, the visual display 43 allows the user to stop the outdoor power machine 14 and instruct an individual or pet to remove themselves/itself from the working area without shutting down the machine 14 or move the outdoor power machine 14 away from the object.

Figure 7:
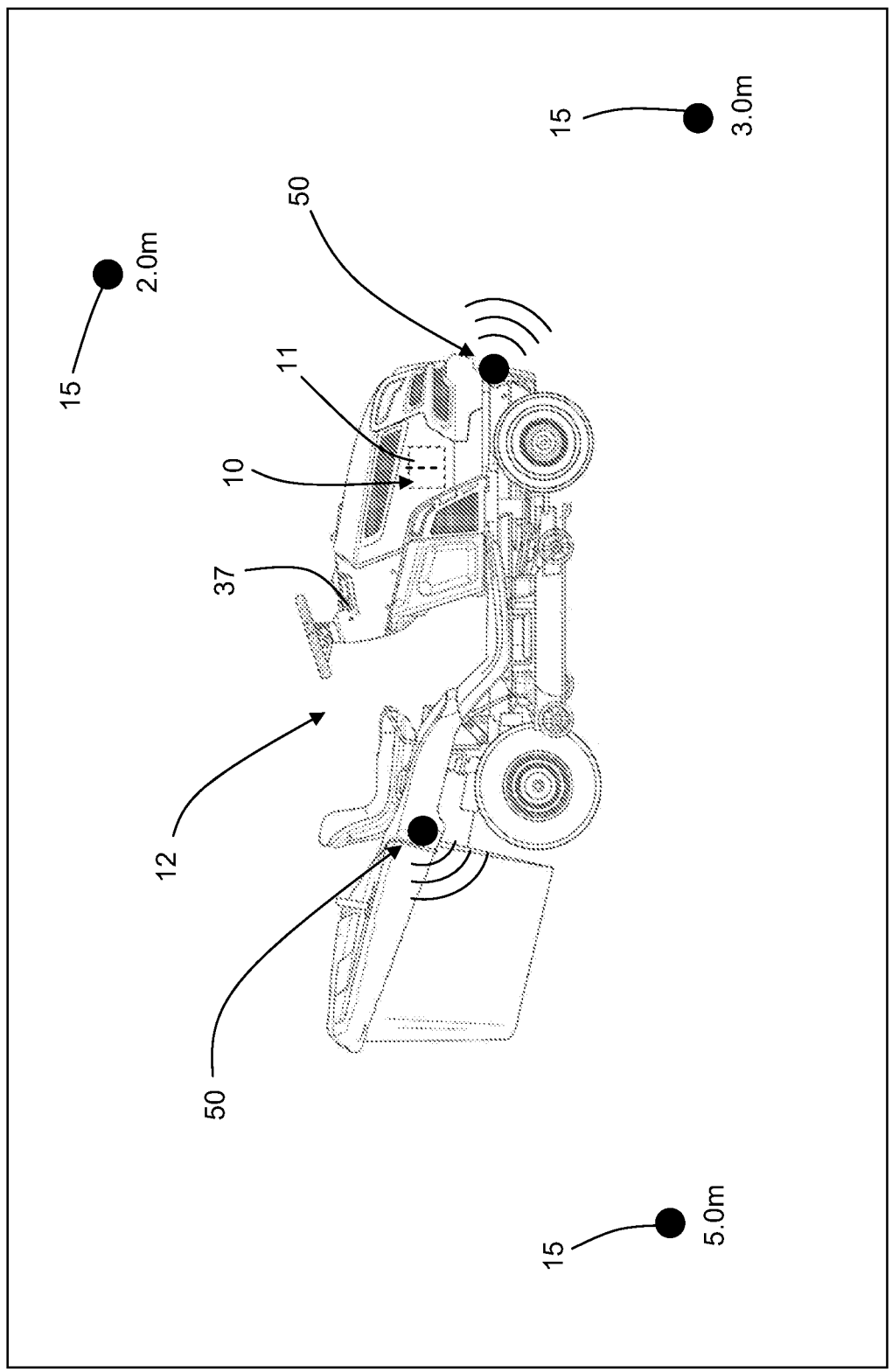
FIG. 7 is a schematic of a system according to an alternative embodiment of the invention.

In another embodiment, the system 10 may also include an object detection system 50, FIG. 7. Examples of known types of object detection systems 50 include radio-wave based sensors (e.g. RADAR), laser-based sensors (e.g. LIDAR), sound-based sensors (e.g. Ultrasonic), and passive or active infrared sensors ("IR"). Any other suitable object detection system that is capable of identifying an objects location and distance from the outdoor power machine 14 may be used. The benefit of using an object detection system 50 is that the system does not rely on the object having a transmitter attached/connected thereto; rather, the object detection system 50 transmits a signal outwardly from the outdoor power machine 14 which is reflected back towards the object detection system 50. The object detection system 50 then measures the reflected signal to determine geographical location and distance relative to the outdoor power machine 14. The geographical location and distance may then be displayed on the visual display 43 to provide the user with the geographical location and distance to the object 15 and take corrective action as described above.

In general, the system 10 measures the distance between the outdoor power machine 14 and an object positioned within a working area of the outdoor power machine 14. For example, when transmitters 42 are used, the communications device 33 receives the transmitted signal from the transmitters 42 and relays that signal to the switching circuit 32 or, optionally, the processor 34. If a processor is not employed, then the communications device 33 may send a signal instructing the switching circuit 32 to interrupt the electrical path only if the transmitted signal is of a pre-specified strength. If the processor 34 is employed, the processor 34 may determine the distance between the outdoor power machine 14 and the transmitters 42 and compare the measured distance to a pre-determined threshold, i.e., 1.5 m (5 ft). For example, if the measured distance is less than the pre-determined threshold, then the processor 34 instructs the switching circuit 32 to interrupt the electrical path between the electrical system 19 and the spark plug 18, thereby shutting the outdoor power machine 14 down. In the simplest case, the switching circuit 32 or the processor 34 may interrupt the electrical path any time the signal from the transmitter 42 is received, without performing any signal strength measurement or distance computation. In this case the pre-determined threshold would simply be the lowest detectable signal strength.

If the outdoor power machine 14 includes an integrated controller 37, the processor 34' would instruct the controller 37 to shut down the electrical system 19, thereby shutting down the outdoor power machine 14 (this is the equivalent of turning off an ignition switch). Alternatively, the controller 37 may deactivate certain aspects of the outdoor power machine 14 instead of shutting down the prime mover 16. For example, the controller 37 may decrease the amount of throttle being applied to the prime mover 16 to decrease speed of the outdoor power machine 14, may apply a brake to stop movement of the outdoor power machine, may prevent a user from engaging a transmission of an outdoor power machine 14, may prevent a user from engaging a selected gear of the transmission (forward or reverse), may disengage a cutting mechanism such as a lawn mower deck or other type of attachment or mechanism associated with the outdoor power machine 14, and/or any other suitable control to prevent interaction between the object 15 and the outdoor power machine 14.

The object detection system 50 would operate in the same manner, except that instead of relying on signal strength from transmitters 42 to determine distance, the system 10 would use the object detection system 50 to determine a geographical location and distance of the object.

The foregoing has described a system and method for proximity-based control of an outdoor power machine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An outdoor power machine proximity-based control system, comprising an object detection system operably connected to an outdoor power machine, the object detection system being configured to transmit a signal into a work area of the outdoor power machine and receive reflected signals from objects located within the work area and a controller configured to control a pre-determined function of the outdoor power machine in response to a triggering event, the controller including:
   a housing having a receptacle at a first end of the housing for receiving a spark plug of the outdoor power machine therein and a spark plug terminal at a second end of the housing for being received by a spark plug terminal of an electrical system of the outdoor power machine;
   electronics including a switching circuit operably connected to a communications device, the switching circuit being configured to interrupt an electrical path between the electrical system of the outdoor power machine and the spark plug, the communications device is configured to receive a signal indicative of a location of an object relative to the outdoor power machine, wherein the controller is configured to cause the switching circuit to interrupt the electrical path between the electrical system and the spark plug in response to the received signal; and
   a ground strap operably connected between the electronics and a ground of the outdoor power machine to ground the switching circuit and allow the switching circuit to interrupt the electrical path.

2. The system according to claim 1, wherein the controller includes a processor to process the received signal and compare it to a pre-determined threshold.

3. The system according to claim 1, further including a transmitter operably connected to the object, the transmitter transmitting a signal to the communications device to inform the controller that an object is present in a work area of the outdoor power machine.

4. The system according to claim 3, wherein a strength of the signal being transmitted by the transmitter provides the controller with an indication of a distance between the controller and the object.

5. The system according to claim 1, further including a visual display to provide a user with a visual indication of a location of the object within the work area of the outdoor power machine.

6. The system according to claim 1, further including a visual display configured to provide a user of the outdoor power machine a geographical location of the object relative to the outdoor power machine.

7. The system according to claim 1, further including a visual display configured to provide a user with visual warnings.

8. The system according to claim 7, wherein the visual warnings include colors to indicate a safe distance to the object, a caution distance to the object, and a not safe distance to the object.

9. An outdoor power machine proximity-based control system, comprising:
   (a) an outdoor power machine having an engine including a spark plug;
   (b) a controller connected to the outdoor power machine, the controller-including:
      (i) a housing having a receptacle connected to the spark plug of the outdoor power machine therein and a spark plug terminal connected to a spark plug terminal of an electrical system of the outdoor power machine; and
      (ii) electronics including a switching circuit operably connected to a communications device, the switching circuit being configured to interrupt an electrical path between the electrical system of the outdoor power machine and the spark plug; and
      (iii) a ground strap operably connected between the electronics and a ground of the outdoor power machine to ground the switching circuit and allow the switching circuit to interrupt the electrical path;
   (c) at least one object transmitter operably connected to an object in a work area of the outdoor power machine, wherein the object transmitter is configured to transmit a signal that is received by the communications device, and wherein the communications device is configured to receive the signal and determine a strength thereof, wherein the controller is configured to cause the switching circuit to interrupt the electrical path between the electrical system and the spark plug when a strength of the signal meets a pre-determined threshold, thereby shutting down the engine of the outdoor power machine; and
   (d) a visual display configured to provide a user with visual warnings, the visual warnings including colors to indicate a safe distance to the object, a caution distance to the object, and a not safe distance to the object.

10. The system according to claim 9, further including a receiver operably connected to the communications device.

11. The system according to claim 9, wherein the controller includes a processor to process the received signal and compare it to a pre-determined threshold, and wherein instructions from the processor include displaying the location of the object on the visual display.

12. A method of using the outdoor power machine proximity-based control system of claim 9, comprising the steps of:
   (a) detecting an object located in a work area of an outdoor power machine;
   (b) in response to detection of an object, determining a location of the object relative to the outdoor power machine;
   (c) comparing a distance from the location of the object to a location of the outdoor power machine to a pre-determined threshold; and
   (d) interrupting an electrical path to the engine of the outdoor power machine when the distance is less than the pre-determined threshold, thereby shutting down the engine and making the outdoor power machine inoperable.

13. The method according to claim 12, further including the step of disengaging a transmission of the outdoor power machine to prevent the outdoor power machine from moving.

14. The method according to claim 12, further including the step of providing a user with a visual indication of the location of an object located within the work area to allow the user to take corrective actions and prevent interaction between the outdoor power machine and the object.

15. The method according to claim 12, wherein the step of detecting an object further includes the step of using a transmitter to transmit a signal to provide data indicative of the location of the object.

16. The method according to claim 15, further including the step of using a communications device to receive data from the transmitted signal.

17. The method according to claim 16, further including the step of using a processor to process the received data and perform the steps of determining a location, comparing a distance, and causing an action.

18. The method according to claim 12, wherein the pre-determined threshold is a distance anywhere within detectable range.

19. The system according to claim 9, further including a machine transmitter operably connected to the outdoor power machine, wherein the machine transmitter transmits a signal into the work area of the outdoor power machine and receives a reflected signal when the transmitted signal is reflected by an object in the work area, and wherein a processor of the controller processes the reflected signal to determine a location of the object relative to the location of the outdoor power machine.

\* \* \* \* \*